US012558779B2

(12) United States Patent
Ibarra Von Borstel et al.

(10) Patent No.: US 12,558,779 B2
(45) Date of Patent: Feb. 24, 2026

(54) SELF-RECONFIGURABLE ROBOT CONTROLLER

(71) Applicant: Intel Corporation, Santa Clara, CA (US)

(72) Inventors: Alejandro Ibarra Von Borstel, Manchaca, TX (US); Fernando Ambriz Meza, Manchaca, TX (US); Cornelius Buerkle, Karlsruhe (DE); Jose Rodrigo Camacho Perez, Guadalajara (MX); Hector Cordourier Maruri, Guadalajara (MX); Paulo Lopez Meyer, Zapopan (MX); Fabian Oboril, Karlsruhe (DE); Julio Zamora Esquivel, West Sacramento, CA (US); Jose Miguel Hernandez Miramontes, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 18/193,797

(22) Filed: Mar. 31, 2023

(65) Prior Publication Data

US 2024/0326242 A1 Oct. 3, 2024

(51) Int. Cl.
B25J 9/16 (2006.01)

(52) U.S. Cl.
CPC .............. B25J 9/163 (2013.01); B25J 9/161 (2013.01)

(58) Field of Classification Search
CPC . B25J 9/163; B25J 9/161; B25J 13/00; G05B 2219/39311
See application file for complete search history.

(56) References Cited

U.S. PATENT DOCUMENTS

| | | | | |
|---|---|---|---|---|
| 11,457,983 B1 * | 10/2022 | Roh | ....................... | A61B 34/25 |
| 2013/0086441 A1 * | 4/2013 | Yang | .............. | G01R 31/318555 714/E11.155 |
| 2013/0297043 A1 * | 11/2013 | Choi | ...................... | G05B 15/02 700/3 |
| 2016/0092175 A1 * | 3/2016 | Keene | ....................... | G06F 9/46 717/113 |
| 2018/0169861 A1 * | 6/2018 | Singh | .................... | G06F 13/385 |

(Continued)

OTHER PUBLICATIONS

Beckhoff USA, "ATRO: Automation Technology for Robotics—The Modular Industrial Robot System", https://www.beckhoff.com/en-us/products/motion/atro-automation-technology-for-robotics/, 3 pgs, Feb. 1, 2023.

(Continued)

*Primary Examiner* — Adam R Mott
*Assistant Examiner* — Sagar Kc
(74) *Attorney, Agent, or Firm* — Banner & Witcoff, Ltd.

(57) ABSTRACT

A self-reconfigurable controller for a robot, including: input/output (I/O) interfaces to enable communication with I/O peripheral devices coupled to the robot; and processing circuitry that is operable to: register the I/O peripheral devices and associated functionalities; receive a command for the robot to perform a task; conduct a self-awareness check to correlate functionalities to perform the task with functionalities of the I/O peripheral devices; and generate, based on a net of deep learning (DL) models and a result of the correlation, a target deep learning controller (TDLC) model to control the robot to perform the task.

12 Claims, 14 Drawing Sheets

100
Robotic System

Input Peripheral Devices 120

122
Stereo
Microphone

Audio FSID

124
Camera

Video FSID

110
Robot with
Robot Controller System
(RCS)

Output Peripheral Devices 130

Servo FSID

132
Servo Motor

Display FSID

134
Display

Input Communication Channels 126

Output Communication Channels 136

(56) References Cited

U.S. PATENT DOCUMENTS

| | | | | |
|---|---|---|---|---|
| 2019/0183591 | A1* | 6/2019 | Johnson | B25J 9/1666 |
| 2020/0042010 | A1* | 2/2020 | Nakajima | G05D 1/0246 |
| 2020/0086480 | A1* | 3/2020 | Haddadin | B25J 9/1633 |
| 2022/0335292 | A1* | 10/2022 | Aoki | G06Q 30/0265 |
| 2022/0395977 | A1* | 12/2022 | Beardsworth | B25J 9/1656 |
| 2023/0028405 | A1* | 1/2023 | Malzahn | B25J 9/161 |
| 2023/0068323 | A1* | 3/2023 | Gemignani | B25J 9/1676 |
| 2023/0166403 | A1* | 6/2023 | Gao | B25J 9/1682 |
| | | | | 700/248 |

OTHER PUBLICATIONS

A. Faina, "Evolving Modular Robots: Challenges and Opportuni-
ties", IT University of Copenhagen, 4 pgs.
S. Hauser, et al. "Roombots Extended: Challenges in the Next
Generation of Self-Reconfigurable Modular Robots and Their Appli-
cation in Adaptive and Assistive Furniture", Science Direct, Robot-
ics and Autonomous Systems, 12 pgs., vol. 127, May 2020.
S. Reichhuber, et al., "Active Reinforcement Learning: A Roadmap
Towards Curious Classifier Systems for Self-Adaptation", 13 pgs.,
Intelligent Systems, University of Kiel, Jan. 11, 2022.
W. Zhu, et al., "Self-Directed Machine Learning", Journal of Latex
Class Files, vol. 14, No. 8, 14 pgs., Aug. 2015.

* cited by examiner

<u>100</u>
Robotic System

Input Peripheral Devices 120

Output Peripheral Devices 130

<u>122</u>
Stereo
Microphone

Audio FSID

<u>110</u>
Robot with
Robot Controller System
(RCS)

Servo FSID

<u>132</u>
Servo Motor

<u>124</u>
Camera

Video FSID

Display FSID

<u>134</u>
Display

Input Communication Channels 126

Output Communication Channels 136

300
Robot Controller System (RCS) Process

FIG 4

400
Example Python Snippet for Creating Domain Namespaces

Generate a seed ID with UUID V1, to avoid randomness, to generate functionality namespaces.

```
UUID V1 used like a seed ID for generating non-random namespaces
idSeed = uuid.uuid1()
print(idSeed)

59a281d6-175c-11ed-a65d-0800273fa080
```

Generate Functionality namespaces

```
visionDomain = "Vision"
visionNamespaceID = uuid.uuid5(idSeed, visionDomain)
print(visionNamespaceID)
speechDomain = "Speech"
speechNamespaceID = uuid.uuid5(idSeed, speechDomain)
print(speechNamespaceID)
naturalLanguageDomain = "NLP"
naturalLanguageNamespaceID = uuid.uuid5(idSeed, naturalLanguageDomain)
print(naturalLanguageNamespaceID)
displayDomain = "Display"
displayNamespaceID = uuid.uuid5(idSeed, displayDomain)
print(displayNamespaceID)
speakerDomain = "Speaker"
speakerNamespaceID = uuid.uuid5(idSeed, speakerDomain)
print(speakerNamespaceID)
servoDomain = "Servo"
servoNamespaceID = uuid.uuid5(idSeed, servoDomain)
print(servoNamespaceID)

ad8be6d2-cf1d-54e6-ee55-58047f4a8271
18614942-d49c-571e-84a5-8a26c9c955c7
a5347e98-1808-5bd6-8a2f-e14f28036e8c
32f8c281-f758-5889-ac4d-400d28b8ac88
11c8b930-488c-5d12-879e-86ecd64567b8
cb091d83-f2c8-53b2-bbe3-b816417cae6c
```

FIG 5

500
Example Domain Namespace Dictionary

```
namespaceDict = {speechNamespaceID: [
    ("recognize voice commands from microphone", "mono-mic;identify;audio-commands"),
    ("identify voice orders from microphone", "mono-mic;identify;audio-commands"),
    ("classify audio instruction from mic", "mono-mic;identify;audio-commands"),
    ("classify spoken command controls from array", "array-mic;identify;audio-commands"),
    ("identify voice orders from mic array", "array-mic;identify;audio-commands"),
    ("classify audio instruction from microphone array", "array-mic;identify;audio-commands"),
    ("discriminate voice control commands from headset", "stereo-mic;identify;audio-commands"),
    ("tell me what voice control commands come from the headset", "stereo-mic;identify;audio-commands"),
    ("classify voice commands from the headset", "stereo-mic;identify;audio-commands"),
    ("identify speaking user from headset", "stereo-mic;identify;speaking-user"),
    ("tell me who is talking in the headset", "stereo-mic;identify;speaking-user"),
    ("classify users talking with the headset", "stereo-mic;identify;speaking-user"),
    ("classify user from microphone", "mono-mic;identify;speaking-user"),
    ("identify user on microphone", "mono-mic;identify;speaking-user"),
    ("discriminate users talking to the mic", "mono-mic;identify;speaking-user"),
    ("tell me who is speaking at the mic array", "array-mic;identify;speaking-user"),
    ("use the mic array to classify users", "array-mic;identify;speaking-user"),
    ("classify users with the microphone array", "array-mic;identify;speaking-user")],
visionNamespaceID: [
    ("let me know what digit is presented to the webcam", "web-cam;identify;digit"),
    ("classify digits with the webcam", "web-cam;identify;digit"),
    ("identify numbers with the cam", "web-cam;identify;digit")],
```

FIG 6

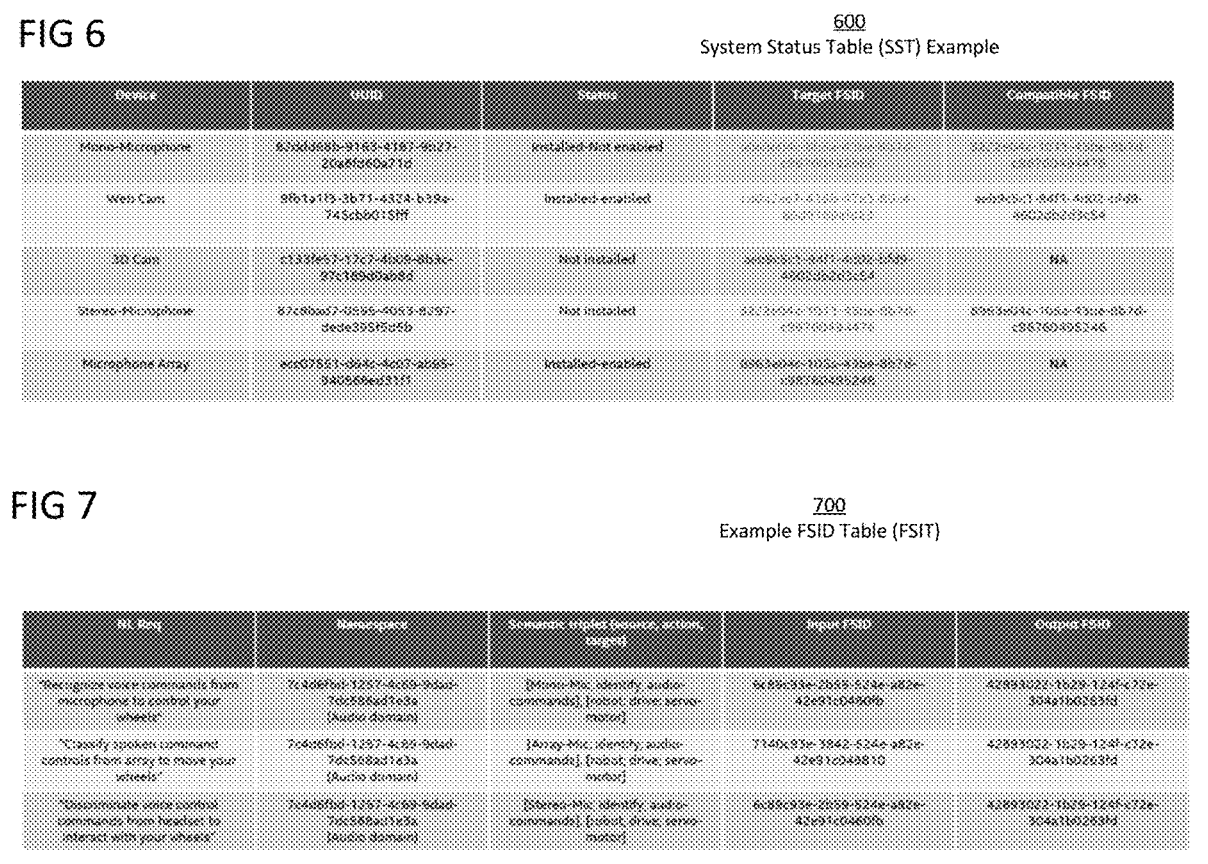

600
System Status Table (SST) Example

| Device | GUID | Status | Input FSID | Configuration FSID |
|---|---|---|---|---|
| Mono-Microphone | 60360960-9160-4167-9027-20e65960a21d | Installed-Not enabled | | |
| Web Cam | 9fb1a1f9-3b71-4324-b39a-74Scb6015ff | Installed-enabled | | aeb9a5c1-86f3-4602-a948-a6f02cb2d3c54 |
| 3D Cam | c133fe57-17c9-4320-abac-27c160a0ba8d | Not installed | | NA |
| Stereo-Microphone | 87c8baa57-0596-4063-8297-dede39Sf5d5b | Not installed | | 60b3bd4c-1050-43ca-8b70-c98760406246 |
| Microphone Array | 60b03b31-ab4d-4637-a8a5-5405680ea2311 | Installed-enabled | | NA |

FIG 7

700
Example FSID Table (FSIT)

| AI Bot | Description | Semantic model (sensor, action, output) | Input FSID | Output FSID |
|---|---|---|---|---|
| "Recognize voice commands from microphone to control your wheels" | 7c4a6fbd-1297-4c69-9dad-7dc568ad1e3a (Audio domain) | [Mono-Mic, identify audio commands], [robot, drive, servo-motor] | 6c89c39e-2868-524e-a82e-42e91c048010 | 42893932-1b29-124f-c72e-304a1b0263fd |
| "Classify spoken command controls from array to move your wheels" | 7c4a6fbd-1297-4c69-9dad-7dc568ad1e3a (Audio domain) | [Array-Mic, identify audio commands], [robot, drive, servo-motor] | 7140c39e-1842-524e-a82e-42e91c048010 | 42893932-1b29-124f-c72e-304a1b0263fd |
| "Disseminate voice control commands from headset to interact with your wheels" | 7c4a6fbd-1297-4c69-9dad-7dc568ad1e3a (Audio domain) | [Stereo-Mic, identify audio commands], [robot, drive, servo-motor] | 6c89c39e-2868-524e-a82e-42e91c048010 | 42893932-1b29-124f-c72e-304a1b0263fd |

800
Example of Natural Language FSID Model

900A
Example Diagram of Self-Generation DL Model Net —
I/O FSID-2 Topology Transformer Model 900B
Example Diagram of Self-Generation DL Model Net —
Layer Index Classifier Model 900C
Example Diagram of Self-Generation DL Model Net —
Parameter Sequence Generater Model Model

FIG 11

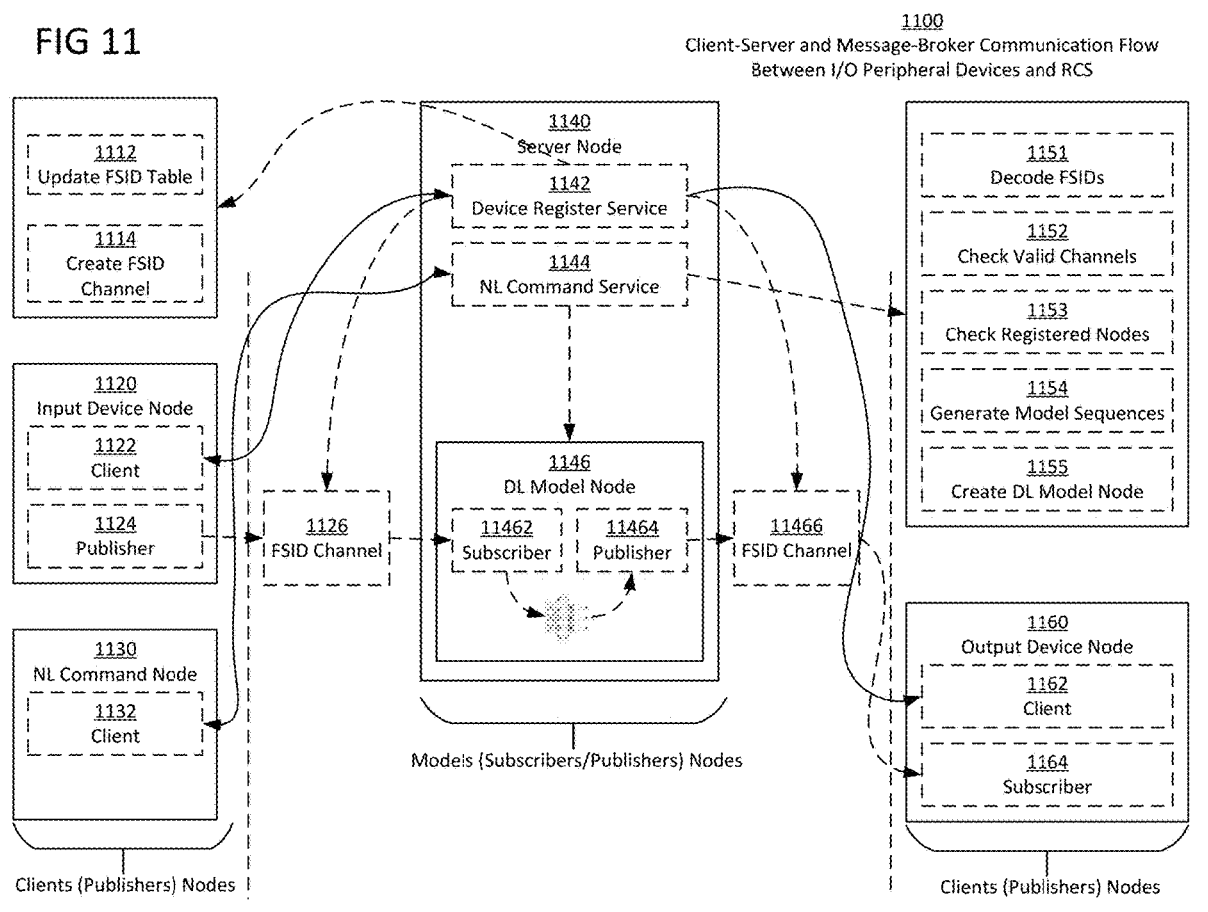

1100
Client-Server and Message-Broker Communication Flow
Between I/O Peripheral Devices and RCS 1112
Update FSID Table 1114
Create FSID Channel 1120
Input Device Node 1122
Client 1124
Publisher 1126
FSID Channel 1130
NL Command Node 1132
Client Clients (Publishers) Nodes 1140
Server Node 1142
Device Register Service 1144
NL Command Service 1146
DL Model Node 11462
Subscriber 11464
Publisher 11466
FSID Channel Models (Subscribers/Publishers) Nodes 1151
Decode FSIDs 1152
Check Valid Channels 1153
Check Registered Nodes 1154
Generate Model Sequences 1155
Create DL Model Node 1160
Output Device Node 1162
Client 1164
Subscriber Clients (Publishers) Nodes 1200
I/O Peripheral Device
Registration Service Process 1300
Controller Self-Generation Method SAR: Self-Aware Response
NLC: Natural Language Client
NLS: Natural Language Service
IOD: I/O Device
FSID Functional Semantic Identifier
FSIDT: FSID Table

SELF-RECONFIGURABLE ROBOT CONTROLLER

TECHNICAL FIELD

Aspects described herein generally relate to a robot controller, and more particularly, to a robot controller that is self-reconfigurable.

BACKGROUND

High-tech companies design robots with controller system hardware and software tailored for specific tasks. While modular robots (MR) or self-reconfigurable modular robots (SRMRs) offer more flexibility, they still require external intervention to be reconfigured for new tasks.

BRIEF DESCRIPTION OF THE DRAWINGS

FIG. 4 illustrates an example of a python snippet used for creating domain namespaces, in accordance with aspects of the disclosure.

FIG. 5 illustrates an example domain namespace dictionary, in accordance with aspects of the disclosure.

FIG. 6 illustrates an example of a System Status Table (SST), in accordance with aspects of the disclosure FIG. 7 illustrates an example of a functional semantic identifier (FSID) table, in accordance with aspects of the disclosure.

FIG. 11 illustrates schematic diagram of client-server and message-broker communication flows between I/O peripheral devices and the self-reconfigurable controller, in accordance with aspects of the disclosure.

DETAILED DESCRIPTION

The present disclosure is directed to a robot controller system (RCS; self-reconfigurable controller) with self-awareness of its existing or missing skills and capabilities (i.e., functionalities) for the robot to execute a given task. The RCS can determine what kind of tools or equipment it needs to complete a particular task. For instance, if the task is to "follow a sound," the RCS is cognizant that the robot requires a microphone, or if the robot is asked to "follow a line," the robot needs a camera. The RCS can infer what the robot needs to accomplish a new or different task without external intervention. For example, if the robot is asked to "navigate a crowded room," the RCS can infer automatically that it requires a depth sensor to navigate through the environment.

Additionally, the RCS has a controller self-generation capability to enable it to self-generate a deep learning (DL) controller model to adapt a robot's behavior to accomplish a new task commanded by a user or application. The robotic system is able to evolve its RCS on a single iteration, even when the new morphology and objective are changed to a new domain.

Figure 1:
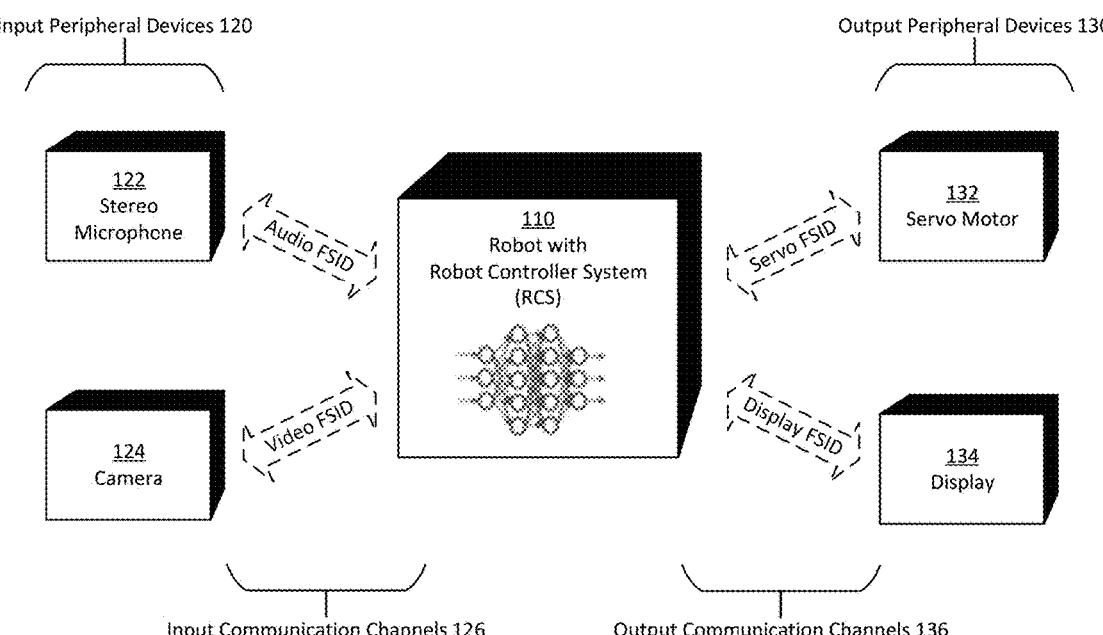
FIG. 1 illustrates a schematic diagram of a robotic system, in accordance with aspects of the disclosure.

FIG. 1 illustrates a schematic diagram of a robotic system 100, in accordance with aspects of the disclosure.

The robotic system 100 comprises input/output (I/O) peripheral devices 120, 130 coupled to a robot 110. The robot 110 has a robot controller system (RCS; or self-reconfigurable controller) with input/output (I/O) interfaces to enable communication with the I/O peripheral devices 120, 130. The input peripheral devices 120 in this example comprise a stereo microphone 122 and a camera 124, each operable to communicate with the robot 110 via a respective input communication channel 126. The output peripheral devices 130 in this example comprise a servo motor 132 and a display 134, each operable to communicate with the robot 110 via a respective output communication channel 136. The particular I/O peripheral devices 120, 130 shown are merely examples and not limited thereto.

Figure 2:
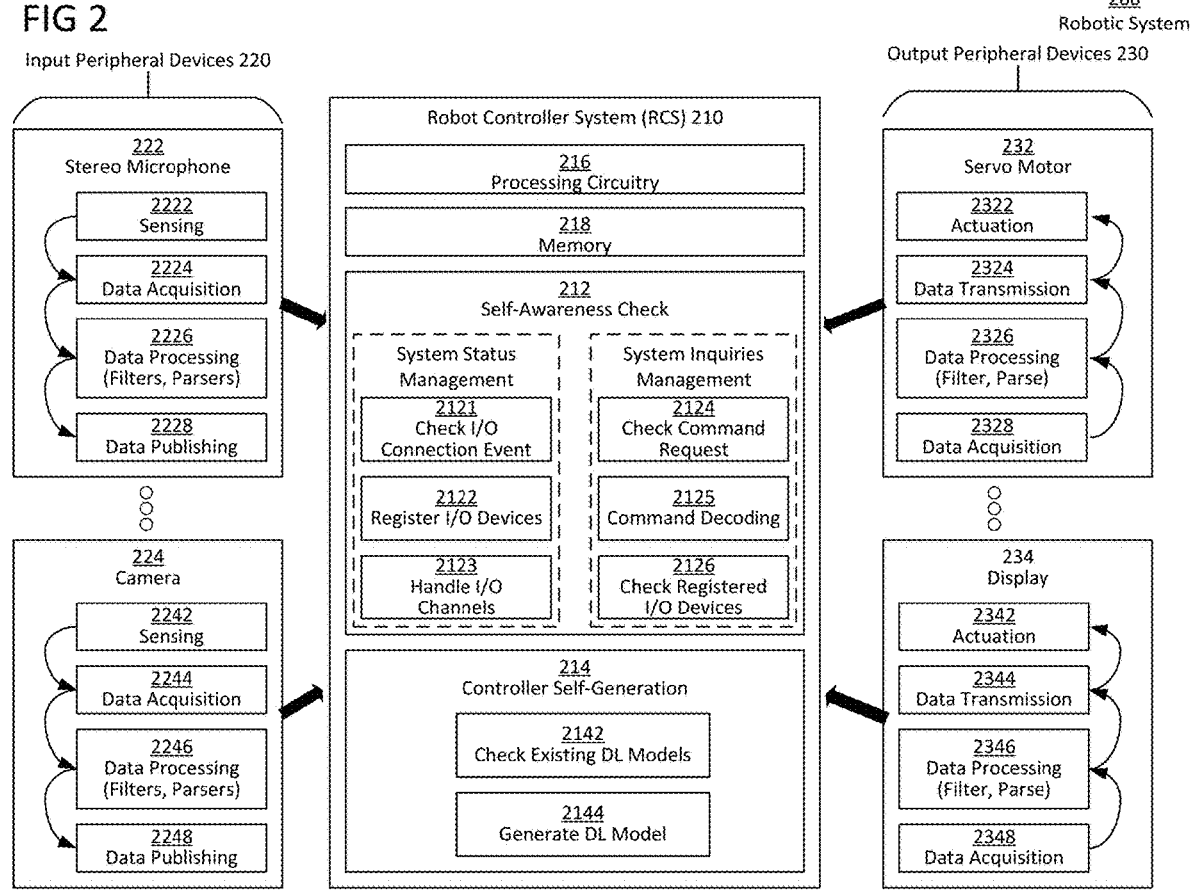
FIG. 2 illustrates a schematic diagram of a robotic system, with device types and functions, in accordance with aspects of the disclosure.

FIG. 2 illustrates a schematic diagram of a robotic system 200 similar to the robotic system 100 of FIG. 1, with more detail with respect to device types and functions. The robotic system 100 comprises a robot controller system (RCS) 210 and input/output (I/O) devices 220 and 230, respectively.

The RCS 210 has a self-aware check 212 for the robot 110 to self-generate an RCS 210 for a new morphology. Processing circuitry 216 is operable to cause the RCS 210 to perform functions, such as those related to the self-awareness check 212 and the controller self-generation 214 as described below.

The I/O peripheral devices 220, 230 are represented by a set of different types of devices that embed basic functional blocks which enable communication for self-awareness tasks. The input peripheral devices 220 include, as examples, stereo microphone 222 and camera 224. The functionalities of each of these input peripheral devices 222, 224 include sensing 2222, 2242, data acquisition 2224, 2244, data processing 2226, 2246, and data publishing 2228, 2248.

The output peripheral devices 230 include, as examples, a servo motor 232 and a display 234. The functionalities of each of these output peripheral devices 232, 234 include actuation 2322, 2342, data transmission 2324, 2344, data processing 2326, 2346 (i.e., filtering, parsing . . . ), and data acquisition 2328, 2348.

I. ROBOT CONTROLLER SYSTEM (SELF-RECONFIGURABLE CONTROLLER) 210

Figure 3:
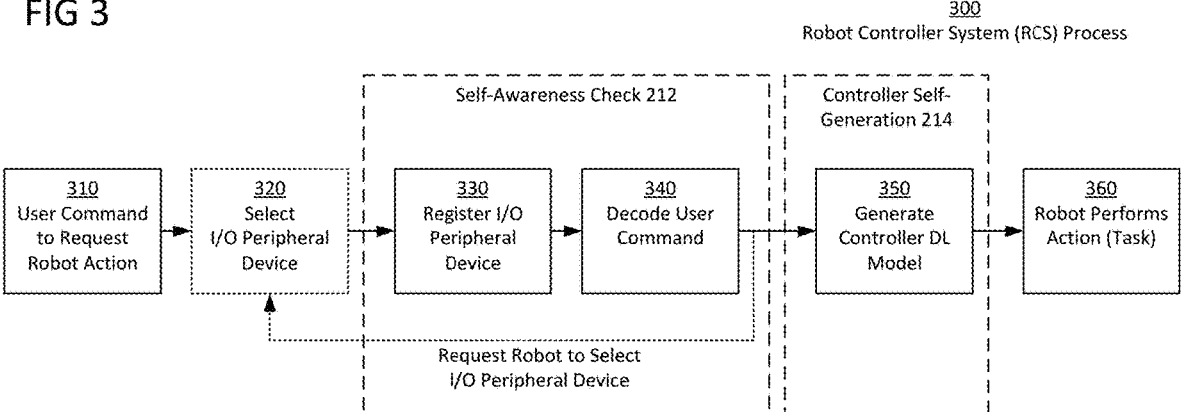
FIG. 3 illustrates a schematic diagram of the robotic control system (RCS) process, in accordance with aspects of the disclosure.

FIG. 3 illustrates a schematic diagram of the RCS process 300, in accordance with aspects of the disclosure.

At Step 310, a user issues a command for the robot 110 to perform an action/task.

At Steps 330 and 340, processing circuitry 216 of the RCS 210 conducts a self-awareness check 212 to correlate functionalities to perform the task with functionalities of the I/O peripheral devices 220, 230. At Step 330, the RCS 210 registers the I/O peripheral devices 220, 230 and associated functionalities. At Step 340, the RCS 210 decodes the command from a natural language format to an input FSID and an output FSID of the functionalities to perform the task.

At Step 350, the processing circuitry 216 of the RCS 210 generates a deep learning (DL) controller. More specifically, the processing circuitry 216 generates, based on a net of DL models and a result of the correlation, a target deep learning controller (TDLC) model to control the robot 110 to perform the task. And at Step 360, the robot 110 performs the task.

The aspects of this disclosure apply to robots 110 that self-reconfigure their physical morphology, and also to robots 110 in which an external actor manually changes the I/O peripheral devices 220, 230. More specifically, in the self-configure physical morphology scenario, the robot 110 has embedded the possible I/O peripheral device 220, 230 that could be used to perform a set of predefined actions and enable/activate them depending on user's request. After the self-awareness check 212 and before the controller self-generation 214, at Step 320, the RCS 210 may request the robot 110 to select an I/O peripheral device 220, 230. Alternatively, with the manual morphology reconfiguration, the external actor changes I/O peripheral device 220, 230 (i.e., input sensors 220 as well as output actuators 230) of the robot 110 to enable the robot 110 to perform the new task.

A. Self-Awareness Check 212

Returning to FIG. 2, the self-awareness check 212 is distributed into two pipelines—system status management (2121, 2122, and 2123 in FIG. 2) and system inquiries management (2124, 2125, and 2126 in FIG. 2).

The system status management is where the robotic controller system (RCS) manages I/O peripheral device connection requests 2121, I/O peripheral device registration 2122, and I/O peripheral device communication channels 2123.

The I/O peripheral device connection request 2121 includes the RCS 210 listening for I/O peripheral device connection requests, and upon hearing a request, initiating an I/O peripheral device registration.

During I/O peripheral device registration 2122, the RCS 210 obtains, from the I/O peripheral device 220, 230 device connection request, information such as a universal unique identifier (UUID), functional semantic identifier (FSID), and compatible FSID. This information is stored in an FSID table (FSIT). These identifiers are described in detail further below.

For the I/O peripheral device communication channel handling 2123, the RCS 210 checks if the RCS 210 has a communication channel already defined for the specific I/O peripheral device FSID. If not, the RCS 210 creates a corresponding channel between itself and the I/O peripheral device 220, 230 with a messaging channel labeled as its FSID.

The system inquiries management is where the RCS manages an input command request 2124, command decoding 2125, and I/O peripheral devices registration check 2126.

For the input command request 2124, the RCS 210 listens for user commands. These commands may be entered through an input pad embedded in the RCS 210, text, or audio commands. The RCS 210 could optionally be an external I/O peripheral device with a specific FSID indicating that it will be used as a command input device.

For the command decoding 2125, the commands may be natural language (NL) commands, though the disclosure is not limited in this respect. Once a user sends a command to the RCS 210, a command decoder 2125 decodes this command sequence from a natural language format to a related pair of FSIDs. The first of the pair of FSIDs corresponds to an input of FSID, and the second to output FSID.

During the I/O peripheral device registration check 2126, the RCS 210 uses the decoded pair of FSIDs to check if there is any I/O peripheral device 220, 230 coupled and listening to the corresponding FSID communication channel. In other words, the RCS 210 checks if there is a correlation of the functionalities to perform the task with the functionalities of the I/O peripheral devices 220, 230 is performed based on the input FSID and the output FSID of the command with the FSIDs of the I/O peripheral devices. This is how the RCS 210 checks whether there are any I/O peripheral devices 220, 230 that are already registered and have the functionalities to execute the task related to the user's command.

1. Functional Semantic Identifiers (FSIDs)

Functional semantic identifiers (FSIDs) are non-random identifiers representing functionalities of the I/O peripheral devices 220, 230. The FSIDs group the I/O peripheral devices 220, 230 into specific domain (functional) namespaces. The creation of FSIDs is done off-line.

FIG. 4 illustrates an example of a python snippet used for creating domain namespaces. The namespace identifiers serve as input seeds for generating the FSIDs with input strings that represent more specific tasks. For instance, to create FSIDs for a speech domain, a set of semantic strings is manually defined with the format "<source>; <action>; <target>". A semantic string represents the meaning of a possible user command entered to the robotic system 100. The semantic string and a domain namespace identifier are then used to generate the FSID. FSIDs are used by the entire robotic system 100 to group input peripheral devices 220 capable of capturing related input signals and delivering features for target output peripheral devices 230 (actuators).

The set of domain namespaces may be generated in accordance with a standard, such as Universal Unique Identifier 5 (UUID5). The seed may be generated with, for example, the UUID1 standard, based on hardware data and an input string. The input strings represent different domains such as "vision", "speech", "NLP" (natural language processor), "display", "speaker", "servo", or the like, which cover I/O peripheral device functionalities that the robotic system 100 handles.

FIG. 5 illustrates an example domain namespace dictionary 500 used in combination with a pair of descriptive strings and a semantic triplet representation to complete the metadata for generating FSIDs.

2. Registering Connected I/O Peripheral Devices 2122

FIG. 6 illustrates an example of a System Status Table (SST) 600. When I/O peripheral devices 220, 230 request a connection with the RCS 210, the connection request includes specific data such as UUID, FSID, and compatible FSID. Then, the RCS 210 uses this information to update the SST 600.

The robotic system 100 may accomplish more than one task with a single I/O peripheral device 220, 230. To inform the RCS 210 that a single peripheral I/O peripheral device 220, 230 could be used to perform more than one task, "Compatible FSID" data is defined and shared it with the RCS 210 so to update the SST 600 with this information.

For example, as observed in the SST 600, the stereo-microphone FSID is compatible with a microphone-array FSID. The means that if the robot 110 is commanded to perform a task that targets the stereo-microphone FSID, and the robotic system 100 does not have this particular device installed or enabled in the SST 600, then the microphone-array could be used as an alternative input device 220 for accomplishing the task.

3. Natural Language (NL) Command Decoding 2125

FIG. 7 illustrates an example of FSID table (FSIT) 700, which includes a natural language request, a namespace (FSID name), a semantic triplet (source, action, target), an input FSID of the input I/O peripheral device 220, and an output FSID of the output peripheral device 230.

The FSIDs involved in the operation of the RCS 210 are generated off-line and used to manually create the FSID table 700. The FSID table 700 will be used to generate a training dataset for the NL-2-FSID transformer model that transforms user's command into natural language to I/O peripheral device FSIDs, as will be described further below.

Functionalities (capabilities) are abstracted into natural language queries, converting questions into operations over FSIDs and FSITs. Sample questions include "What are you?" (decoding all sequences of FSIDs registered in the FSIT 700 into a specific goal), "What can you do?" (decoding each FSID sequence in the FSIT 700 into a task domain sequence), "Can you do this?" (searching for a specific FSID or compatible FSID in the FSIT 700), "How could you do it better?" (searching relational pairs of target FSIDs and compatible FSIDs and the SST 600, and "What do you need to accomplish the task?" (correlating the SST 600 for installed/available I/O peripheral devices 220, 230 and the FSIT 700 for any FSID or a compatible FSID).

Figure 8:
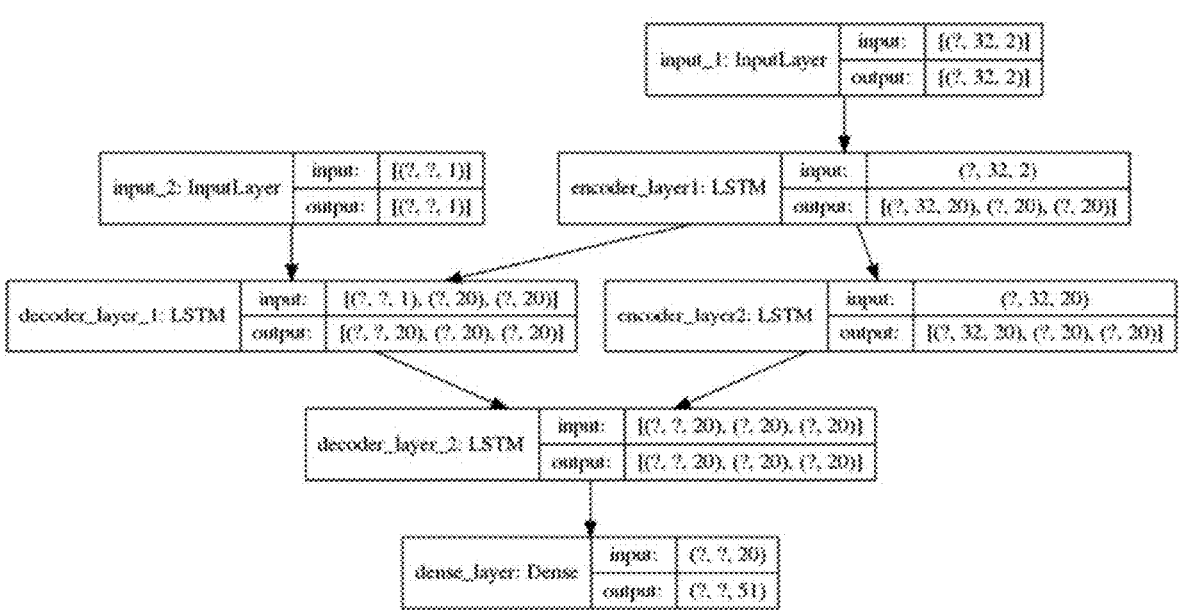
FIG. 8 illustrates an example of a natural language FSID transformer model, in accordance with aspects of the disclosure.

FIG. 8 illustrates an example of an NL-2-FSID transformer model 800, which is used to convert a natural language query into its corresponding FSID. This model topology 800 is merely an example, the details of which should be generally understood. For the sake of brevity and to not obscure other aspects of the disclosure, a detailed description is omitted.

B. Controller Self-Generation 214

The controller self-generation 214 allows the RCS 210 to evolve layer-by-layer in a single iteration, and also reduces memory for storing a set of DL models required to accomplish a corresponding set of possible user commands of different domains.

Returning to FIG. 2, the RCS 210 checks, based on the received command, if there is an existing target DL controller (TDLC) model (2142). If a suitable target TDLC model does not exist, the RCS 210 generates a new target TDLC model (2144).

Figure 9A:
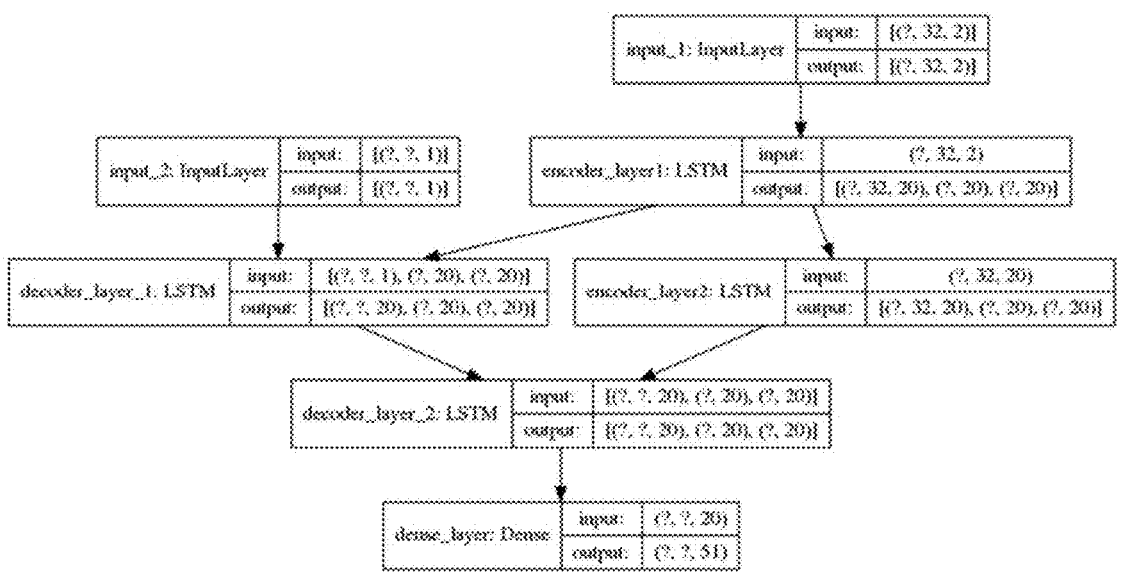
FIGS. 9A-9C illustrate a net of three respective DL models for self-generating a target DL controller (TDLC) model, in accordance with aspects of the disclosure.
Figure 9B:
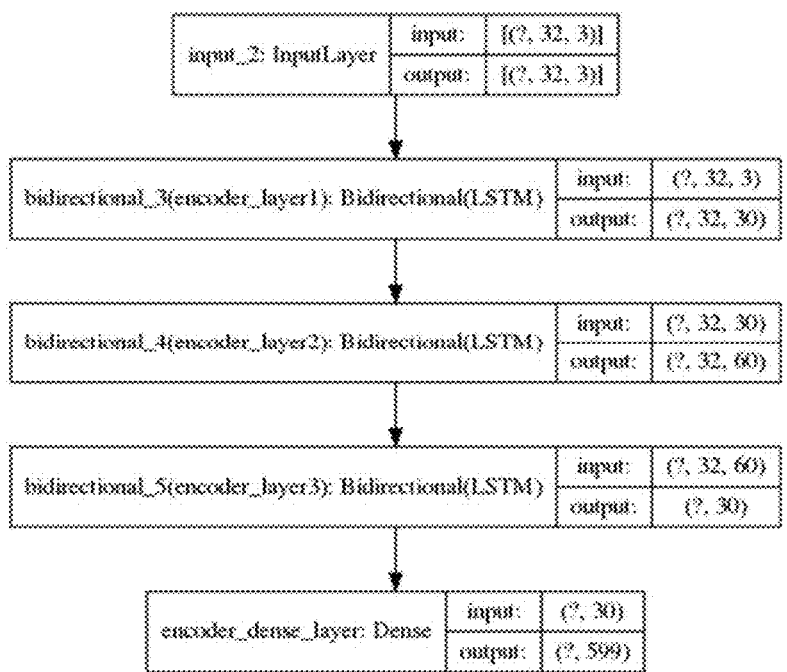
Figure 9C:
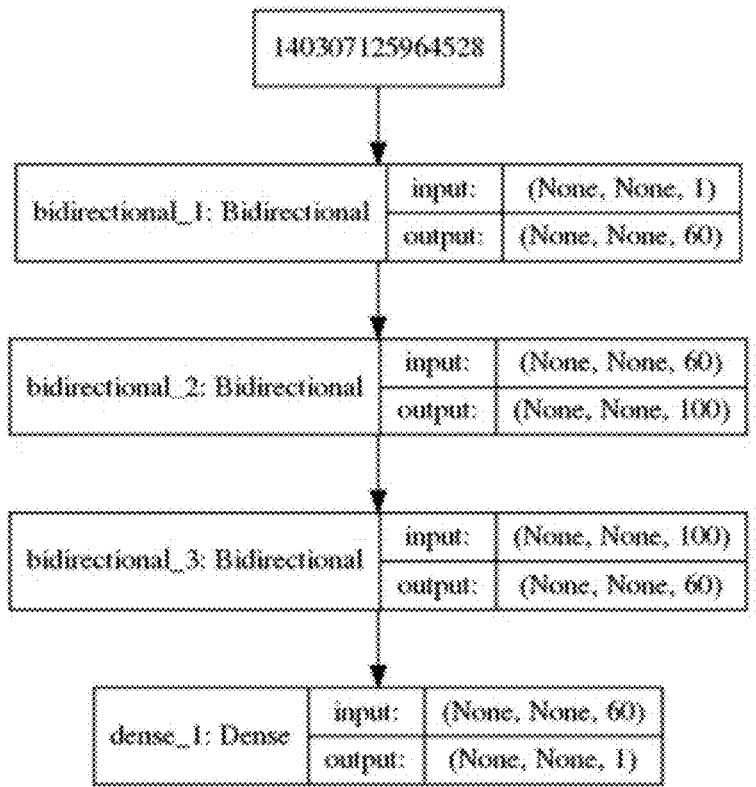

FIGS. 9A-9C illustrate a net of three DL models for self-generating a TDLC model. FIG. 9A illustrates an example of an I/O FSID-2-topology transformer model 900A. FIG. 9B illustrates an example of a layer index classifier model 900B. FIG. 9C illustrates an example of a parameter sequence generator model 900C.

The defined net of DL models enables the RCS 210 to encode connected I/O peripheral device FSIDs, and decode the FSIDs into metadata sequences of a TDLC model. A generated TDLC model represents the new controller block of the RCS 210. The net comprises the three DL models listed in the previous paragraph. The first two models—I/O FSID-2-Topology transformer model 900A and layer index classifier model 900B—are implemented instead of a single I/O FSID-2 Parameter transformer in order to reduce the complexity of the implementation, increase the model performance, and reduce training time.

The topology transformer model 900A is operable to take the output of the NL-2-FSID transformer model 800 and to transform an input FSID and an output FSID of the functionalities of the I/O peripheral devices 220, 230 from the user command into a sequence representing a topology of the TDLC.

The output of this topology transformer model 900A is divided into subsequences representing the respective one of TDLC layers. Each subsequence is labeled with a layer index used to train the layer Index classifier model 900B. Each layer index is used as a starting token for predicting its corresponding parameters (weights and biases).

The last element of the DL models net is the parameter sequence generator model 900C that receives the layer index from the previous model 900B, and then predicts parameters of the TDLC model layers.

The controller self-generation TDLCs optimize memory usage. With three DL models, eight DL controller models may be generated for eight example use cases. The example use cases comprise array of microphones to identify audio command, mono microphone to identify speakers, keyword input to classify sentiment, array of microphones to classify speakers, stereo audio input to classify commands, mono microphone to classify audio commands, stereo input to identify speakers, and webcam to identify digits.

The specific models 900A, 900B, and 900C illustrated in the figures are merely examples, the details of which should be generally understood. For the sake of brevity and to not obscure other aspects of the disclosure, further description is omitted.

II. INPUT/OUTPUT (I/O) PERIPHERAL DEVICES

Figure 10:
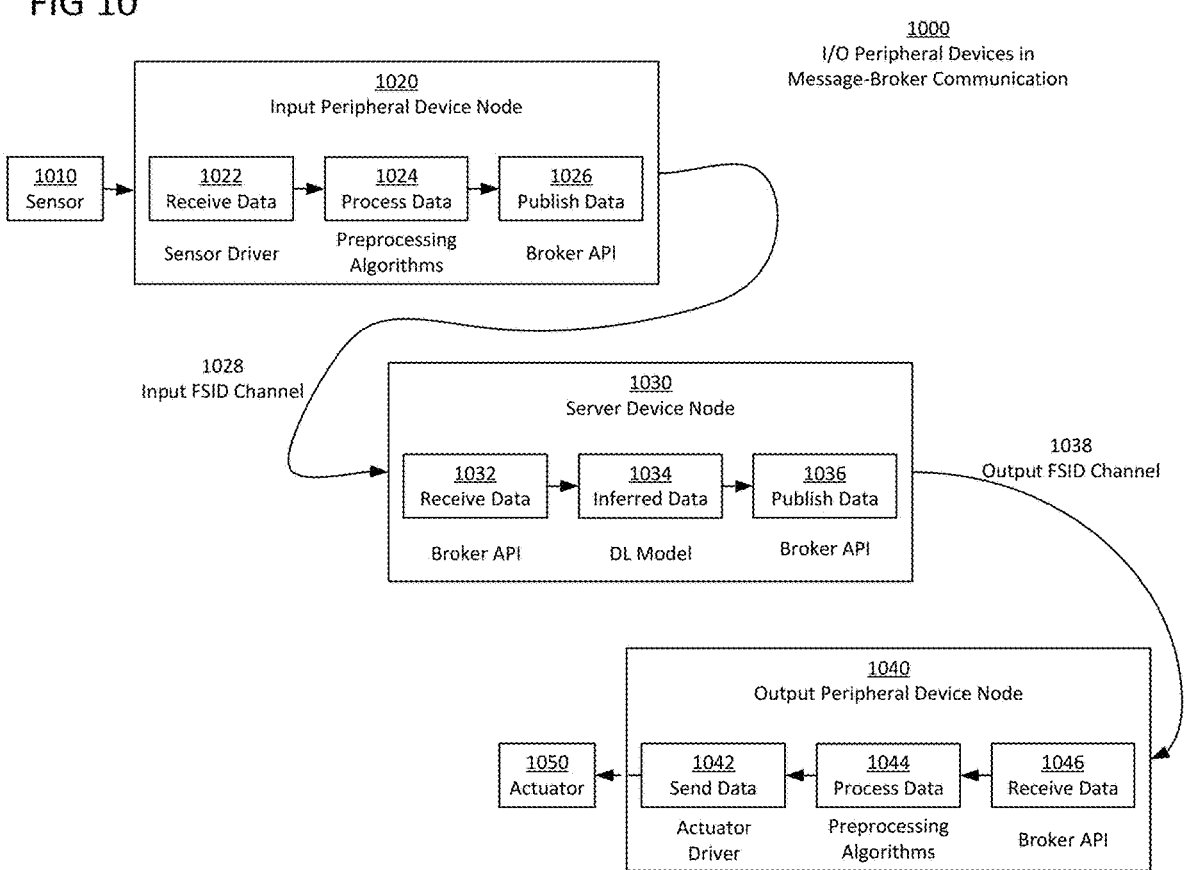
FIG. 10 illustrates a schematic diagram for I/O peripheral devices in message-broker communication, in accordance with aspects of the disclosure.

FIG. 10 illustrates a schematic diagram for I/O peripheral devices 220, 230 in message-broker communication 1000, in accordance with aspects of the disclosure. I/O peripheral devices 220, 230 implemented in firmware a post-process data, where the input nodes refer to operations such as analog-to-digital (A/D) conversions, filtering, and formatting. For the output nodes, the firmware passes the published data into an actuator input type.

Within the input peripheral device node 1020, a sensor driver receives data 1022 from a sensor 1010. Preprocessing algorithms are used to process the data 1024. A broker API publishes the data 1026 on an input FSID channel 1028.

At the server device node 1030, a broker API receives the data 1032 that was transmitted over the input FSID channel 1028. A DL model infers the data 1034. A broker API publishes the inferred data 1036 over an output FSID channel 1038.

At the output peripheral device node 1040, a broker API receives the data 1046 that was transmitted over the output FSID channel 1038. Preprocessing algorithms process the data 1044. An actuator driver 1042 then sends the data to an actuator 1050.

III. COMMUNICATION PROTOCOL

FIG. 11 illustrates schematic diagram of client-server and message-broker communication flows 1100 between I/O peripheral devices 220, 230 and the RCS 210, in accordance with aspects of the disclosure. The solid lines represent service communication flow, and the dotted lines represent message-broker communication flow.

The self-awareness check 212 is implemented by a combination of client-server and message-broker communication protocols. The initial state of the robotic system 100 requires defined elements for communication. On the server side, the elements are "Device Register Service" (DRS) and "NL Command Service" (NCS). The client side has hardware devices with a software/firmware capability to use APIs for the two types of communication flows.

The client server 1122 of the input device node 1120 starts the registration process by sending a request to the device register service 1142 of the server node 1140. This begins the service for updating the FSID table 1112, and creating an FSID channel 1114 for the message-broker flow. The input device node 1120 then switches to the message-broker communication protocol and publishes 1124 to the FSID channel 1126 that is created. The FSID channel 1126 is a channel of communication for messages from the input peripheral device 220 to the RCS 210. A similar process is performed for the output device node 1160 having a client 1162 and subscriber 1164 and communicating via FSID channel 11466

The input device node 1120 sends to the natural language command service 1144 a request for the robot 100 to perform a task. The request is decoded 1151 from the natural language 1151 to a pair of FSIDs obtained from the FSID table 1112. A check is made 1152 for a valid channel. Another check is made of the register nodes 1153 for compatible FSIDs. DL model sequences are then generated 1154 for creating 11155 a DL model node 1146 for acting on the request with the input device node 1120 and the output device node 1160 via the DL model node's subscriber 11462 and publisher 11464.

Figure 12:
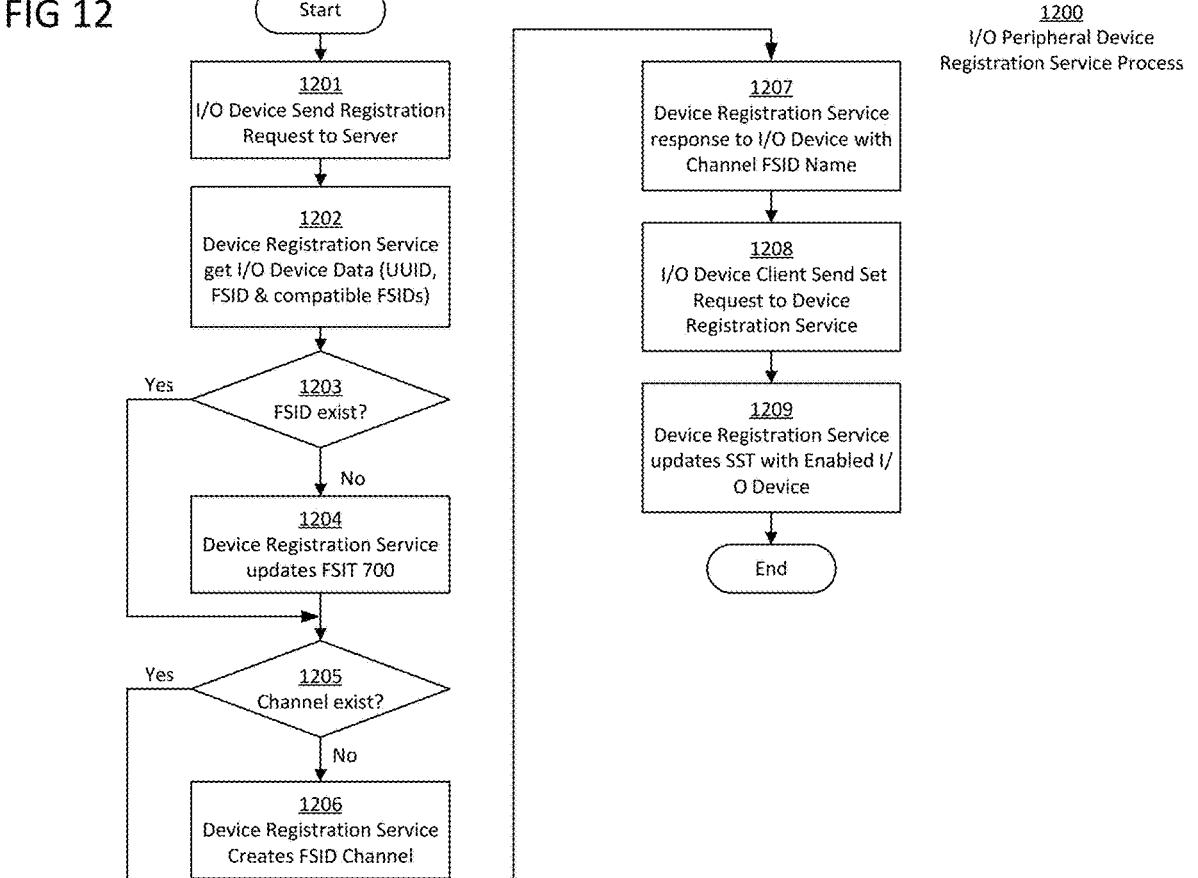
FIG. 12 illustrates a flow diagram of I/O peripheral device registration service 1200, in accordance with aspects of the disclosure.

FIG. 12 illustrates a flow diagram of I/O peripheral device registration service 1200, in accordance with aspects of the disclosure.

A server node (RCS 210), updates the SST 600 and FSIT 700 with I/O peripheral device descriptor data (i.e., UUID, FSID, and compatible FSIDs), and creates communication channels for establishing future message-broker communications. The communication channel names are the same as the FSID of the registered I/O peripheral device 220, 230. In this way, I/O peripheral devices 220, 230 sharing the same FSID share the same communication channel. A I/O peripheral device 220, 230 is considered to be installed and enabled when it is registered in the FSIT 700 and when the UUID of the I/O peripheral device 220, 230 is subscribed to its FSID channel.

The process begins with the I/O peripheral device 220, 230 sending a registration request to the server (RCS 210) (1201). The I/O peripheral device 220, 230 provides its device data (i.e., UUID, FSID & compatible FSIDs) (1202). If the FSID does not already exist (1203), the device registration service updates the FSIT 700 with the FSID (1204), and otherwise skips this step. If a channel does not already exist for the I/O peripheral device 220, 230 (1205), the device registration service creates an FSID channel (1206), and otherwise skips this step. The device registration service provide the I/O peripheral device 220, 230 with a channel FSID name (1207), and the I/O peripheral device client sends a set request to the device registration service (1208). Finally, the device registration services updates the SST 600 with the enabled I/O peripheral device (1209).

Figure 13:
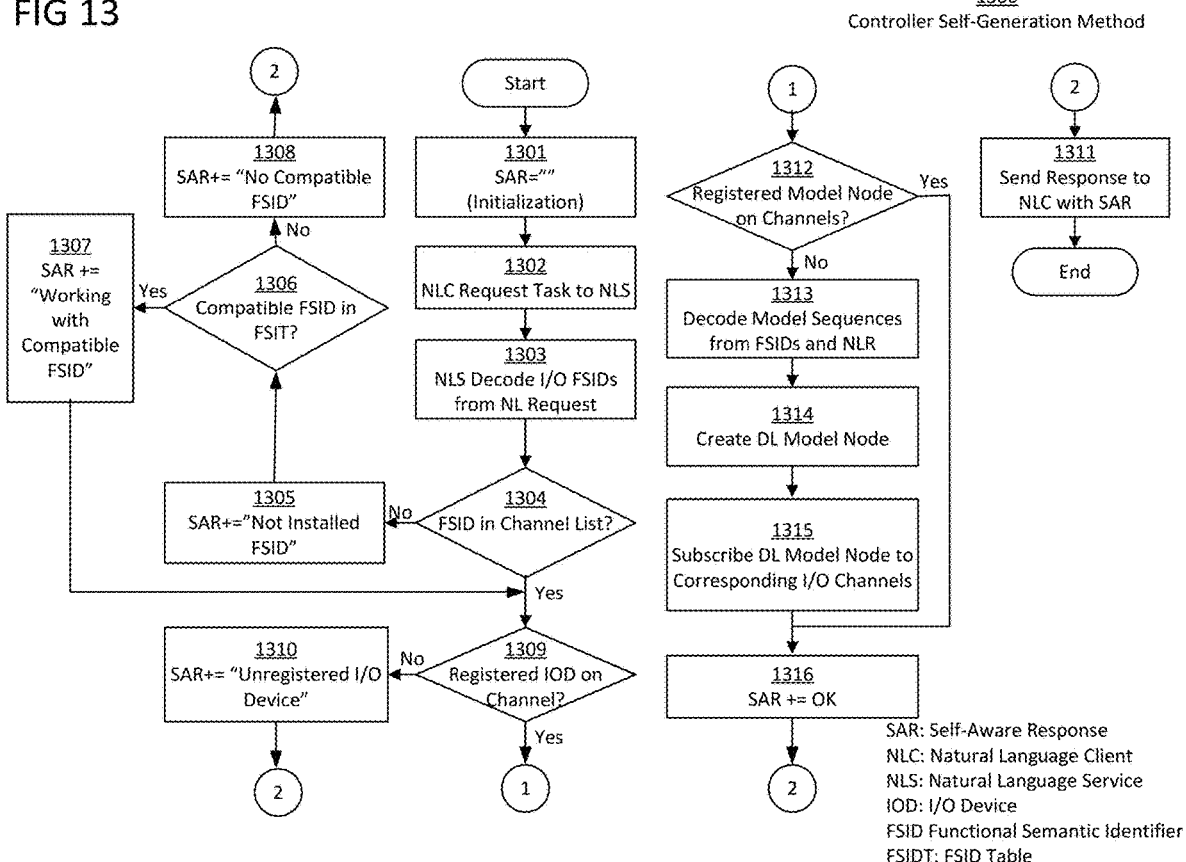
FIG. 13 illustrates a controller self-generation method 1300, in accordance with aspects of the disclosure.

FIG. 13 illustrates a controller self-generation method 1300, in accordance with aspects of the disclosure.

The TDLC generation flow 1300 is initiated by a Natural Language Command (NLC) node. After initialization (i.e., start with an authorization response) (1301) the natural language client (NLC) request task is sent to the natural language service (NLS) (1302), which decodes the I/O peripheral device FSIDs from the NL request (1303).

The RCS 210 makes four decisions (1304, 1306, 1309, 1312) prior to generating a TDLC to be injected to a DL model node. The first decision 1304 is to check if there is an FSID installed (listed as a communication channel), and if not, the RCS 210 answers that there is a missing FSID to do the task (1305). The second decision 1306 is to check for any compatible FSID to use in place of the target FSID so the RCS 210 can control the robot 100 to perform the task with an alternative I/O peripheral device 220, 230, likely with a lower performance (yes 1307; no 1308). Another check (1309) is if there are any I/O peripheral device 220, 230 registered to the FSID channel such as a publisher or subscriber on the channel, and if not, then the RCS 210 does not have any enabled I/O peripheral device 220, 230 to collect data or perform an action 1310; otherwise, a self-aware response is sent to the natural language client (1311).

The last decision 1312 is to check if the RCS 210 already has a DL model node created and listening to the corresponding channels. If not, model sequences are decoded from the FSIDs and the natural language request (NLR) (1313), a DL model node is created (1314), and the DL model node is subscribed to corresponding I/O channels (1315). Finally, a self-aware response is sent to the natural language client (1311).

By abstracting semantics from user commands into data structures, functional blocks, and a communication protocol, an RCS 210 is enabled to be self-aware of its own capabilities. Additionally, by using controller self-generation for TDLCs, the robotic system 100 requires less memory. In the exemplary aspects described herein, three 3 DL models (IO FSID-2-topology transformer, layer index classifier, and parameter sequence generator) generate models for eight different use cases. The subject matter offers advantages such as optimization of internal resources (e.g., memory and power) and a significant reduction in real-time DL controller searching, selecting, or updating.

The modular robotics described herein can self-reconfigure their DL model controller systems, thereby enabling manufacturing systems to be adapted easily to meet different production needs. Morphological reconfiguration methodologies that directly benefit from this disclosure include manual morphology reconfiguration and multiple embedded I/O module robot reconfiguration. The manual morphology reconfiguration involves an external actor changing input sensors and output actuators of the modular robot to enable the robot to perform a different task. And in the multiple embedded I/O module robot reconfiguration, the modular robot has embedded all the possible I/O modules that could be used to perform a set of predefined actions and enables/activates them depending on a user request.

IV. PROCESSING CIRCUITRY 216

The processing circuitry 216 may be operable as any suitable number and/or type of computer processors, which may function to control the RCS 210. The processing circuitry 216 may be identified with one or more processors (or suitable portions thereof) implemented by the RCS 210. The processing circuitry 216 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 216 may be operable to carry out instructions to perform arithmetical, logical, and/or input/output (I/O) operations, and/or to control the operation of one or more components of RCS 210 to perform various functions as described herein. The processing circuitry 216 may include one or more microprocessor cores, memory registers, buffers, clocks, etc., and may generate electronic control signals associated with the components of the RCS 210 to control and/or modify the operation of these components. The processing circuitry 216 may communicate with and/or control functions associated with the memory 218. The processing circuitry 216 may additionally perform various operations to control the communications, communications scheduling, and/or operation of other network infrastructure components that are communicatively coupled to the RCS 210.

A communication channel may be operable as any suitable number and/or type of components operable to facilitate receiving and/or transmitting data and/or signals in accordance with one or more communication protocols, as discussed herein. The I/O interface may be implemented as any suitable number and/or type of components that function to interface with a transceiver, such as analog-to-digital converters (ADCs), digital to analog converters, intermediate frequency (IF) amplifiers and/or filters, modulators, demodulators, baseband processors, etc. The I/O interface may thus work in conjunction with the transceiver and form part of an overall communication circuitry implemented by the RCS 210, which may be implemented via the RCS 210 to transmit commands and/or control signals to execute any of the functions describe herein.

The memory 218 is operable to store data and/or instructions such that, when the instructions are executed by the processing circuitry 216, cause the RCS 210 to perform various functions as described herein. The memory 218 may be implemented as any well-known volatile and/or non-volatile memory, including, for example, read only memory (ROM), random access memory (RAM), flash memory, a magnetic storage media, an optical disc, erasable programmable read only memory (EPROM), programmable read only memory (PROM), etc. The memory 218 may be non-removable, removable, or a combination. The memory 218 may be implemented as a non-transitory computer readable medium storing one or more executable instructions such as, for example, logic, algorithms, code, etc.

V. ARTIFICIAL INTELLIGENCE/MACHINE LEARNING

Various aspects herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

VI. EXAMPLES

The techniques of this disclosure may also be described in the following examples.

Example 1. A self-reconfigurable controller for a robot, comprising: input/output (I/O) interfaces to enable communication with I/O peripheral devices coupled to the robot; and processing circuitry that is operable to: register the I/O peripheral devices and associated functionalities; receive a command for the robot to perform a task; conduct a self-awareness check to correlate functionalities to perform the task with functionalities of the I/O peripheral devices; and generate, based on a net of deep learning (DL) models and a result of the correlation, a target deep learning controller (TDLC) model to control the robot to perform the task.

Example 2. The self-reconfigurable controller of example 1, wherein the functionalities are represented by functional semantic identifiers (FSIDs), which are non-random identifiers.

Example 3. The self-reconfigurable controller of any of examples 1-2, wherein the processing circuitry is operable to register each of the I/O peripheral devices by: storing the FSID of the functionality of the I/O peripheral device in a functional semantic identifier table (FSIT), with FSIDs grouped by similarity of represented functionalities; creating a corresponding FSID channel; and storing the I/O peripheral device in a system status table (SST) as enabled.

Example 4. The self-reconfigurable controller of any of examples 1-3, wherein the SST comprises I/O peripheral device information received from the respective I/O peripheral devices, and the I/O peripheral device information comprises a universal unique identifier (UUID), a functional semantic identifier (FSID), and a compatible FSID.

Example 5. The self-reconfigurable controller of any of examples 1-4, wherein the net of DL models comprise: a topology transformer model operable to transform an input FSID and an output FSID of the functionalities to perform the task into a sequence representing a topology of the TDLC, wherein the sequence is divided into subsequences representing respective TDLC model layers; a layer index classifier model operable to classify the subsequences with indexes; and a parameter sequence generator model operable to predict parameters of the TDLC model layers based on the indexes, wherein the TDLC model is generated layer-by-layer in a single iteration.

Example 6. The self-reconfigurable controller of any of examples 1-5, wherein the processing circuitry is further operable to: decode the command from a natural language format to an input FSID and an output FSID of the functionalities to perform the task, wherein the correlation of the functionalities to perform the task with the functionalities of the I/O peripheral devices is performed based on the input FSID and the output FSID of the command with the FSIDs of the I/O peripheral devices.

Example 7. The self-reconfigurable controller of any of examples 1-6, wherein the processing circuitry is further operable to: generate the TDLC model if the self-reconfigurable controller does not already have a suitable TDLC model.

Example 8. The self-reconfigurable controller of any of examples 1-7, wherein if the self-awareness check indicates a lack of a correlation of functionalities to perform the task with functionalities of the I/O peripheral devices, provide an indication of a missing functionality of the I/O peripheral devices.

Example 9. A component of a self-reconfigurable controller for a robot, wherein the self-reconfigurable controller has input/output (I/O) interfaces to enable communication with i/O peripheral devices coupled to the robot, the component comprising: processing circuitry; and a non-transitory computer-readable storage medium including instructions that, when executed by the processing circuitry, cause the processing circuitry to: register the I/O peripheral devices and associated functionalities; receive a command for the robot to perform a task; conduct a self-awareness check to correlate functionalities to perform the task with functionalities of the I/O peripheral devices; and generate, based on a net of deep learning (DL) models and a result of the correlation, a target deep learning controller (TDLC) model to control the robot to perform the task.

Example 10. The component of example 9, wherein the functionalities are represented by functional semantic identifiers (FSIDs), which are non-random identifiers.

Example 11. The component of any of examples 9-10, wherein the processing circuitry is operable to register each of the I/O peripheral devices by: storing the FSID of the functionality of the I/O peripheral device in a functional semantic identifier table (FSIT), with FSIDs grouped by similarity of represented functionalities; creating a corresponding FSID channel; and storing the I/O peripheral device in a system status table (SST) as enabled.

Example 12. The component of any of examples 9-11, wherein the SST comprises 1/O peripheral device information received from the respective I/O peripheral devices, and the I/O peripheral device information comprises a universal unique identifier (UUID), a functional semantic identifier (FSID), and a compatible FSID.

Example 13. The component of any of examples 19-12 wherein the net of DL models comprise: a topology transformer model operable to transform an input FSID and an output FSID of the functionalities to perform the task into a sequence representing a topology of the TDLC, wherein the sequence is divided into subsequences representing respective TDLC model layers; a layer index classifier model operable to classify the subsequences with indexes; and a parameter sequence generator model operable to predict parameters of the TDLC model layers based on the indexes, wherein the TDLC model is generated layer-by-layer in a single iteration.

Example 14. The component of any of examples 9-13, wherein the processing circuitry is further operable to: decode the command from a natural language format to an input FSID and an output FSID of the functionalities to perform the task, wherein the correlation of the functionalities to perform the task with the functionalities of the I/O peripheral devices is performed based on the input FSID and the output FSID of the command with the FSIDs of the i/O peripheral devices.

Example 15. The component of any of examples 9-14, wherein the processing circuitry is further operable to: generate the TDLC model if the component does not already have a suitable TDLC model.

Example 16. The component of any of examples 9-15, wherein if a result of the self-awareness check is a lack of a correlation of functionalities to perform the task with functionalities of the I/O peripheral devices, provide an indication of a missing functionality of the I/O peripheral devices.

Example 17. A robotic system, comprising: input/output (1/O) peripheral devices coupled to a robot; and a self-reconfigurable controller, comprising: I/O interfaces to enable communication with the I/O peripheral devices; and processing circuitry that is operable to: register the I/O peripheral devices and associated functionalities; receive a command for the robot to perform a task; conduct a self-awareness check to correlate functionalities to perform the task with functionalities of the I/O peripheral devices; and generate, based on a net of deep learning (DL) models and a result of the correlation, a target deep learning controller (TDLC) model to control the robot to perform the task.

Example 18. The robotic system of example 17 wherein the functionalities are represented by functional semantic identifiers (FSIDs), which are non-random identifiers.

Example 19. The robotic system of any of examples 17-18, wherein the processing circuitry is operable to register each of the I/O peripheral devices by: storing the FSID of the functionality of the I/O peripheral device in a functional semantic identifier table (FSIT), with FSIDs grouped by similarity of represented functionalities; creating a corresponding FSID channel; and storing the I/O peripheral device in a system status table (SST) as enabled.

Example 20. The robotic system of any of examples 17-19, wherein the net of DL models comprise: a topology transformer model operable to transform an input FSID and an output FSID of the functionalities to perform the task into a sequence representing a topology of the TDLC, wherein the sequence is divided into subsequences representing respective TDLC model layers; a layer index classifier model operable to classify the subsequences with indexes; and a parameter sequence generator model operable to predict parameters of the TDLC model layers based on the indexes, wherein the TDLC model is generated layer-by-layer in a single iteration.

Example 21. A self-reconfigurable controller for a robot, comprising: input/output (I/O) interface means for enabling communication with I/O peripheral devices coupled to the robot; and processing means for: registering the I/O peripheral devices and associated functionalities; receiving a command for the robot to perform a task; conducting a self-awareness check to correlate functionalities to perform the task with functionalities of the I/O peripheral devices; and generating, based on a net of deep learning (DL) models and a result of the correlation, a target deep learning controller (TDLC) model to control the robot to perform the task.

Example 22. The self-reconfigurable controller of example 21, wherein the functionalities are represented by functional semantic identifiers (FSIDs), which are non-random identifiers.

Example 23. The self-reconfigurable controller of any of examples 21-22, wherein the processing means is for registering each of the I/O peripheral devices by: storing the FSID of the functionality of the I/O peripheral device in a functional semantic identifier table (FSIT), with FSIDs grouped by similarity of represented functionalities; creating a corresponding FSID channel; and storing the I/O peripheral device in a system status table (SST) as enabled.

Example 24. The self-reconfigurable controller of any of examples 21-32, wherein the SST comprises 1/O peripheral device information received from the respective I/O peripheral devices, and the I/O peripheral device information comprises a universal unique identifier (UUID), a functional semantic identifier (FSID), and a compatible FSID.

Example 25. The self-reconfigurable controller of any of examples 21-24, wherein the net of DL models comprise: a topology transformer model operable to transform an input FSID and an output FSID of the functionalities to perform the task into a sequence representing a topology of the TDLC, wherein the sequence is divided into subsequences representing respective TDLC model layers; a layer index classifier model operable to classify the subsequences with indexes; and a parameter sequence generator model operable to predict parameters of the TDLC model layers based on the indexes, wherein the TDLC model is generated layer-by-layer in a single iteration.

Example 26. The self-reconfigurable controller of any of examples 21-25, wherein the processing means is for: decoding the command from a natural language format to an input FSID and an output FSID of the functionalities to perform the task, wherein the correlation of the functionalities to perform the task with the functionalities of the I/O peripheral devices is performed based on the input FSID and the output FSID of the command with the FSIDs of the I/O peripheral devices.

Example 27. The self-reconfigurable controller of any of examples 21-26, wherein the processing means is for generating the TDLC model if the self-reconfigurable controller does not already have a suitable TDLC model.

Example 28. The self-reconfigurable controller of any of examples 21-27, wherein if the self-awareness check indicates a lack of a correlation of functionalities to perform the task with functionalities of the I/O peripheral devices, provide an indication of a missing functionality of the I/O peripheral devices.

Example 29. A component of a self-reconfigurable controller for a robot, wherein the self-reconfigurable controller has input/output (I/O) interfaces to enable communication with I/O peripheral devices coupled to the robot, the component comprising: processing means; and a non-transitory computer-readable storage medium including instructions that, when executed by the processing means, cause the processing means to: register the I/O peripheral devices and associated functionalities; receive a command for the robot to perform a task; conduct a self-awareness check to correlate functionalities to perform the task with functionalities of the I/O peripheral devices; and generate, based on a net of deep learning (DL) models and a result of the correlation, a target deep learning controller (TDLC) model to control the robot to perform the task.

Example 30. The component of example 29, wherein the functionalities are represented by functional semantic identifiers (FSIDs), which are non-random identifiers.

Example 31. The component of any of examples 29-30, wherein the processing means is for registering each of the I/O peripheral devices by: storing the FSID of the functionality of the I/O peripheral device in a functional semantic identifier table (FSIT), with FSIDs grouped by similarity of represented functionalities; creating a corresponding FSID channel; and storing the i/O peripheral device in a system status table (SST) as enabled.

Example 32. The component of any of examples 29-31, wherein the SST comprises 1/O peripheral device information received from the respective I/O peripheral devices, and the I/O peripheral device information comprises a universal unique identifier (UUID), a functional semantic identifier (FSID), and a compatible FSID.

Example 33. The component of any of examples 29-32, wherein the net of DL models comprise: a topology transformer model operable to transform an input FSID and an output FSID of the functionalities to perform the task into a sequence representing a topology of the TDLC, wherein the sequence is divided into subsequences representing respective TDLC model layers; a layer index classifier model operable to classify the subsequences with indexes; and a parameter sequence generator model operable to predict parameters of the TDLC model layers based on the indexes, wherein the TDLC model is generated layer-by-layer in a single iteration.

Example 34. The component of any of examples 29-33, wherein the processing means is further for: decoding the command from a natural language format to an input FSID and an output FSID of the functionalities to perform the task, wherein the correlation of the functionalities to perform the task with the functionalities of the I/O peripheral devices is performed based on the input FSID and the output FSID of the command with the FSIDs of the I/O peripheral devices.

Example 35. The component of any of examples 29-34, wherein the processing means is further for: generating the TDLC model if the component does not already have a suitable TDLC model.

Example 36. The component of any of examples 29-35, wherein if a result of the self-awareness check is a lack of a correlation of functionalities to perform the task with functionalities of the I/O peripheral devices, provide an indication of a missing functionality of the I/O peripheral devices.

Example 37. A robotic system, comprising: input/output (I/O) peripheral means coupled to a robot; and a self-reconfigurable controlling means, comprising: I/O interface means for enabling communication with the I/O peripheral devices; and processing means for: registering the I/O peripheral devices and associated functionalities; receiving a command for the robot to perform a task; conducting a self-awareness check to correlate functionalities to perform the task with functionalities of the I/O peripheral devices; and generating, based on a net of deep learning (DL) models and a result of the correlation, a target deep learning controller (TDLC) model to control the robot to perform the task.

Example 38. The robotic system of example 37, wherein the functionalities are represented by functional semantic identifiers (FSIDs), which are non-random identifiers.

Example 39. The robotic system of any of examples 37-38, wherein the processing means is for registering each of the I/O peripheral devices by: storing the FSID of the functionality of the I/O peripheral device in a functional semantic identifier table (FSIT), with FSIDs grouped by similarity of represented functionalities; creating a corresponding FSID channel; and storing the I/O peripheral device in a system status table (SST) as enabled.

Example 40. The robotic system of any of examples 37-39, wherein the net of DL models comprise: a topology transformer model operable to transform an input FSID and an output FSID of the functionalities to perform the task into a sequence representing a topology of the TDLC, wherein the sequence is divided into subsequences representing respective TDLC model layers; a layer index classifier model operable to classify the subsequences with indexes; and a parameter sequence generator model operable to predict parameters of the TDLC model layers based on the indexes, wherein the TDLC model is generated layer-by-layer in a single iteration.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A self-reconfigurable controller for a robot, comprising: input/output (I/O) interfaces to enable communication with I/O peripheral devices coupled to the robot; and processing circuitry that is operable to:

register the I/O peripheral devices and associated functionalities, wherein the functionalities of the I/O peripheral devices are represented by functional semantic identifiers (FSIDs), which are non-random identifiers;

receive a command for the robot to perform a task;

conduct a self-awareness check to correlate functionalities to perform the task with functionalities of the I/O peripheral devices, wherein if the self-awareness check indicates a lack of a correlation of functionalities to perform the task with functionalities of the I/O peripheral devices, provide an indication of a missing functionality of the I/O peripheral devices; and generate, based on a net of deep learning (DL) models and a result of the correlation, a target deep learning controller (TDLC) model to control the robot to perform the task, wherein the net of DL models comprise:

a topology transformer model operable to transform an input FSID and an output FSID of the functionalities to perform the task into a sequence representing a topology of the TDLC, wherein the sequence is divided into subsequences representing respective TDLC model layers;

a layer index classifier model operable to classify the subsequences with indexes; and a parameter sequence generator model operable to predict parameters of the TDLC model layers based on the indexes, wherein the TDLC model is generated layer-by-layer in a single iteration.

2. The self-reconfigurable controller of claim 1, wherein the processing circuitry is operable to register each of the I/O peripheral devices by:

storing the FSID of the functionality of the I/O peripheral device in a functional semantic identifier table (FSIT), with FSIDs grouped by similarity of represented functionalities;

creating a corresponding FSID channel; and storing the I/O peripheral device in a system status table (SST) as enabled.

3. The self-reconfigurable controller of claim 2, wherein the SST comprises I/O peripheral device information received from the respective I/O peripheral devices, and the I/O peripheral device information comprises a universal unique identifier (UUID), a functional semantic identifier (FSID), and a compatible FSID.

4. The self-reconfigurable controller of claim 1, wherein the processing circuitry is further operable to:

decode the command from a natural language format to an input FSID and an output FSID of the functionalities to perform the task, wherein the correlation of the functionalities to perform the task with the functionalities of the I/O peripheral devices is performed based on the input FSID and the output FSID of the command with the FSIDs of the I/O peripheral devices.

5. The self-reconfigurable controller of claim 1, wherein the processing circuitry is further operable to:

generate the TDLC model if the self-reconfigurable controller does not already have a suitable TDLC model.

6. A component of a self-reconfigurable controller for a robot, wherein the self-reconfigurable controller has input/output (I/O) interfaces to enable communication with I/O peripheral devices coupled to the robot, the component comprising:

processing circuitry; and a non-transitory computer-readable storage medium including instructions that, when executed by the processing circuitry, cause the processing circuitry to:

register the I/O peripheral devices and associated functionalities, wherein the functionalities of the I/O peripheral devices are represented by functional semantic identifiers (FSIDs), which are non-random identifiers;

receive a command for the robot to perform a task;

conduct a self-awareness check to correlate functionalities to perform the task with functionalities of the I/O peripheral devices, wherein if a result of the self-awareness check is a lack of a correlation of functionalities to perform the task with functionalities of the I/O peripheral devices, provide an indication of a missing functionality of the I/O peripheral devices; and generate, based on a net of deep learning (DL) models and a result of the correlation, a target deep learning controller (TDLC) model to control the robot to perform the task, wherein the net of DL models comprise:

a topology transformer model operable to transform an input FSID and an output FSID of the functionalities to perform the task into a sequence representing a topology of the TDLC, wherein the sequence is divided into subsequences representing respective TDLC model layers;

a layer index classifier model operable to classify the subsequences with indexes; and a parameter sequence generator model operable to predict parameters of the TDLC model layers based on the indexes, wherein the TDLC model is generated layer-by-layer in a single iteration.

7. The component of claim 6, wherein the processing circuitry is operable to register each of the I/O peripheral devices by:

storing the FSID of the functionality of the I/O peripheral device in a functional semantic identifier table (FSIT), with FSIDs grouped by similarity of represented functionalities;

creating a corresponding FSID channel; and storing the I/O peripheral device in a system status table (SST) as enabled.

8. The component of claim 7, wherein the SST comprises I/O peripheral device information received from the respective I/O peripheral devices, and the I/O peripheral device information comprises a universal unique identifier (UUID), a functional semantic identifier (FSID), and a compatible FSID.

9. The component of claim 6, wherein the processing circuitry is further operable to:

decode the command from a natural language format to an input FSID and an output FSID of the functionalities to perform the task, wherein the correlation of the functionalities to perform the task with the functionalities of the I/O peripheral devices is performed based on the input FSID and the output FSID of the command with the FSIDs of the I/O peripheral devices.

10. The component of claim 6, wherein the processing circuitry is further operable to:

generate the TDLC model if the component does not already have a suitable TDLC model.

11. A robotic system, comprising:

input/output (I/O) peripheral devices coupled to a robot; and a self-reconfigurable controller, comprising:

I/O interfaces to enable communication with the I/O peripheral devices; and processing circuitry that is operable to:

register the I/O peripheral devices and associated functionalities, wherein the functionalities of the I/O peripheral devices are represented by functional semantic identifiers (FSIDs), which are non-random identifiers;

receive a command for the robot to perform a task;

conduct a self-awareness check to correlate functionalities to perform the task with functionalities of the I/O peripheral devices, wherein if a result of the self-awareness check is a lack of a correlation of functionalities to perform the task with functionalities of the I/O peripheral devices, provide an indication of a missing functionality of the I/O peripheral devices; and generate, based on a net of deep learning (DL) models and a result of the correlation, a target deep learning controller (TDLC) model to control the robot to perform the task, wherein the net of DL models comprise:

a topology transformer model operable to transform an input FSID and an output FSID of the functionalities to perform the task into a sequence representing a topology of the TDLC, wherein the sequence is divided into subsequences representing respective TDLC model layers;

a layer index classifier model operable to classify the subsequences with indexes; and a parameter sequence generator model operable to predict parameters of the TDLC model layers based on the indexes, wherein the TDLC model is generated layer-by-layer in a single iteration.

12. The robotic system of claim 11, wherein the processing circuitry is operable to register each of the I/O peripheral devices by:

storing the FSID of the functionality of the I/O peripheral device in a functional semantic identifier table (FSIT), with FSIDs grouped by similarity of represented functionalities;

creating a corresponding FSID channel; and storing the I/O peripheral device in a system status table (SST) as enabled.

*    *    *    *    *